United States Patent [19]

Durand

[11] Patent Number: 5,738,300
[45] Date of Patent: Apr. 14, 1998

[54] HELICOPTER AUTOPILOT PROVIDING AIRSPEED CONTROL

[76] Inventor: Bernard Durand, Chemin Vidal, Route d'Arles, 13300 Salon-de-Provence, France

[21] Appl. No.: 682,505

[22] PCT Filed: Jan. 11, 1995

[86] PCT No.: PCT/FR95/00033

§ 371 Date: Jul. 1, 1996

§ 102(e) Date: Jul. 1, 1996

[87] PCT Pub. No.: WO95/19592

PCT Pub. Date: Jul. 20, 1995

[30] Foreign Application Priority Data

Jan. 12, 1994 [FR] France ................... 94 00497

[51] Int. Cl.⁶ .................. B64C 27/57; G05D 1/08; G05D 13/08
[52] U.S. Cl. .............. 244/17.13; 244/175; 73/178 H
[58] Field of Search ............... 244/17.11, 17.13, 244/76 R, 175, 180, 181, 182, 194, 195, 76 B; 73/178 H

[56] References Cited

U.S. PATENT DOCUMENTS

| | | | |
|---|---|---|---|
| 4,023,409 | 5/1977 | Durand | 244/17.13 X |
| 4,129,275 | 12/1978 | Gerstine et al. | 244/17.13 X |
| 4,168,045 | 9/1979 | Wright et al. | 244/17.13 |
| 4,648,269 | 3/1987 | Durand | 244/17.13 X |
| 4,702,106 | 10/1987 | Hassenpflug et al. | 73/178 H X |
| 4,829,441 | 5/1989 | Mandle et al. | 244/17.13 X |
| 4,834,318 | 5/1989 | Taylor et al. | 244/17.13 |
| 5,169,090 | 12/1992 | Wright et al. | 244/17.13 |

*Primary Examiner*—William Grant
*Attorney, Agent, or Firm*—Blakely Sokoloff Taylor & Zafman

[57] ABSTRACT

The invention relates to novel basic architecture for helicopter autopilots, transforming the conventional objective of maintaining fuselage trim to an objective of maintaining airspeed, and without making use of coupler techniques. On each of the pitch and roll control systems, a known fraction of the output signal (24S) from the flight control is injected by being summed with the standard fuselage trim input (1S). The signal (4S) formed in this way possesses the novel static and dynamic properties required for the control loop to make the helicopter statically stable in speed throughout its flight envelope. The novel architecture makes it possible to replace the conventional fuselage trim signal (1S) with an accelerometer signal. The signal (4S) is displayed in particular on a standard "artificial horizon" type instrument (33), thereby making it possible simultaneously to monitor rapid variations of fuselage trim and to control airspeeds.

8 Claims, 4 Drawing Sheets

HELICOPTER AUTOPILOT PROVIDING AIRSPEED CONTROL

The present invention relates to a method and to associated apparatus for automatically controlling the control surfaces of an aircraft by using an autopilot. In particular it provides apparatus for assisting automatic piloting of rotary wing aircraft for the purpose of keeping the lateral and longitudinal airspeed components equal to desired reference values therefor.

It is known that autopilots can be used to control the flight control means of rotary wing aircraft, such as helicopters. Such autopilots are constituted by two servo-control systems, commonly referred to as the "basic autopilot" for fixing and conserving a reference value, said reference value being relative to the lateral trim of the fuselage for one of the systems and relative to the longitudinal trim for the other.

The terms "roll" and "pitch" are also used for those two kinds of trim respectively.

The reference values are fixed, either by the trim values at the instant at which the corresponding system is put into operation, or else subsequently by certain actions of the pilot on the flight controls, referred to as a "transparent piloting" function, or else finally by putting into operation an optional member referred to as a "flight coupler".

A flight coupler is an electronic computer which, depending on the functions given thereto by the manufacturer, applies new reference fuselage trim values to the "basic autopilot".

To stabilize an airspeed, it is presently necessary to provide the "basic autopilot" with a "speed retention coupler". Even if the fuselage maintains trim perfectly, the speed of a helicopter can vary over very wide ranges, which is considered as being a major defect, particularly when flying on instruments. The speed retention coupler requires at least one speed sensor, function switching means, and means for inputting reference speed values.

In outline, an air speed retention coupler operates as follows:

the difference between the actual airspeed and the reference airspeed is used to generate a new reference trim value for the fuselage, which is then forwarded to the "basic automatic pilot" to be implemented.

Thus, to implement an important piloting function, it is necessary to make use of a system that is somewhat complex, and for which it is also difficult to ensure transparency once the "coupler" has been engaged.

The object of the invention is, in particular, to remedy the above complexity by combining in an entirely novel manner signals that are already available on board helicopters, with such combination eliminating any need for initially maintaining any particular fuselage trim for the helicopter, and thus avoiding any need for an airspeed coupler to exist.

The invention provides apparatus for assisting automatic piloting of rotating wing aircraft for the purpose of keeping the lateral and longitudinal components of the airspeed equal to desired reference values therefor, which apparatus comprises two systems, one for roll and the other for pitch, each of said systems having means for generating a signal that is a function of the trim of the fuselage, signal summing means, signal integrator means, and means for actuating the corresponding flight controls, the apparatus being characterized in that it includes means for generating a signal (24S) that is a function of the position of the cyclic control for the blades of the main rotor or, where appropriate, of the main rotors.

According to a characteristic, at least the signal which is a function of the trim of the fuselage and the signal (24S) which is a function of the position of the cyclic control for the blades of the main rotor, or where appropriate of the main rotors, is used in the summing means of each of the systems.

According to an additional characteristic, for one of the systems, the fuselage trim signal (1S) is a pitch trim signal (THETAF) and the cyclic control position signal (24S) is a longitudinal cyclic control position signal (DM1), and for the other system, the fuselage trim signal (1S) is a roll trim signal (PHIF) and the cyclic control position signal (24S) is a lateral cyclic control position signal (DL1).

According to another additional characteristic, the summing means form a linear combination of the signals (1S) and (24S).

According to another additional characteristic, the linear combination is of the form:

K1*THETAF+K2*DDM1 for pitch, and

K3*PHIF+K4*DL1 for roll, the coefficients K1, K2, K3, and K4 being constant or variable coefficients for matching gain.

According to another additional characteristic, the coefficients K1, K2, K3, and K4 are fixed numerically by the dynamic relationship interconnecting the cyclic flight controls of the aircraft, in pitch and roll respectively, with the blade angles respectively associated therewith. More precisely, and in application of the rules of the art in techniques for adjusting the flight controls of helicopters, the ratio K1/K2 is equal to the ratio b/a of two quantities "a" and "b" as defined below:

"a" is a small variation in the position of the cyclic control as measured by the sensor DDM1 (24S); and "b" is the angular variation of the pitch of the rotor blade placed in a canonical position referred to as "blade advancing" and caused by the variation "a".

The ratio K3/K4 relating to the roll system is established in equivalent manner with the lateral cyclic control DDL1 and the blade in a canonical position referred to as "blade behind".

According to another characteristic, the means for generating a signal (1S) that is a function of the fuselage trim are constituted by an accelerometer associated with a reference tied to the fuselage.

According to another characteristic, the means for generating a signal (1S) that is a function of the fuselage trim are constituted by a pendular level associated with a reference tied to the fuselage.

According to another characteristic, the value of the combination performed by the summing means is displayed to the crew on a direct readout instrument of analog or digital type, and, in opportune manner, on the "artificial horizon" type instrument normally used for controlling fuselage trim. This architecture possesses the normal property of being capable, simultaneously and using the same instrument, of controlling rapid variations of fuselage trim and of piloting airspeeds. Each trim graduation corresponds in stable flight to an associated speed. It is known that this result which is desirable for standards of piloting on instruments, cannot be achieved in general given the irregularity of the "trim/speed" relationships that apply to most helicopters.

A remarkable feature of the apparatus of the invention is that it is compatible with a conventional autopilot insofar as it is permissible to switch from one to the other, should that be the desire of a user, merely by switching the electrical signals conveying the information from the sensors.

Another feature of the invention is that, in one of its embodiments, it makes it possible to substitute accelerometer information for gyro information concerning the trim of the fuselage; this constitutes a technological and financial advantage of major importance, in particular for:

equipping helicopters that are not very sophisticated; and providing a mode of operation capable of backing up a main mode.

Another feature of the invention is its suitability for enabling another mode of automatic piloting to be performed by the system conventionally associated with the roll axis. By providing a new method of maintaining lateral airspeed, that is independent of the method associated with the pitch axis (holding trim or holding longitudinal speed), the invention makes it possible to achieve new qualities of piloting that were previously impossible.

Finally, a new organization of the display conventionally given of fuselage trim in roll and pitch makes it possible to provide a new mode of simultaneously controlling airspeed and fuselage trims via a single instrument.

Other advantages and characteristics of the present invention appear from the following description of two variant embodiments of the invention given with reference to the accompanying figures, in which.

Figure 1:
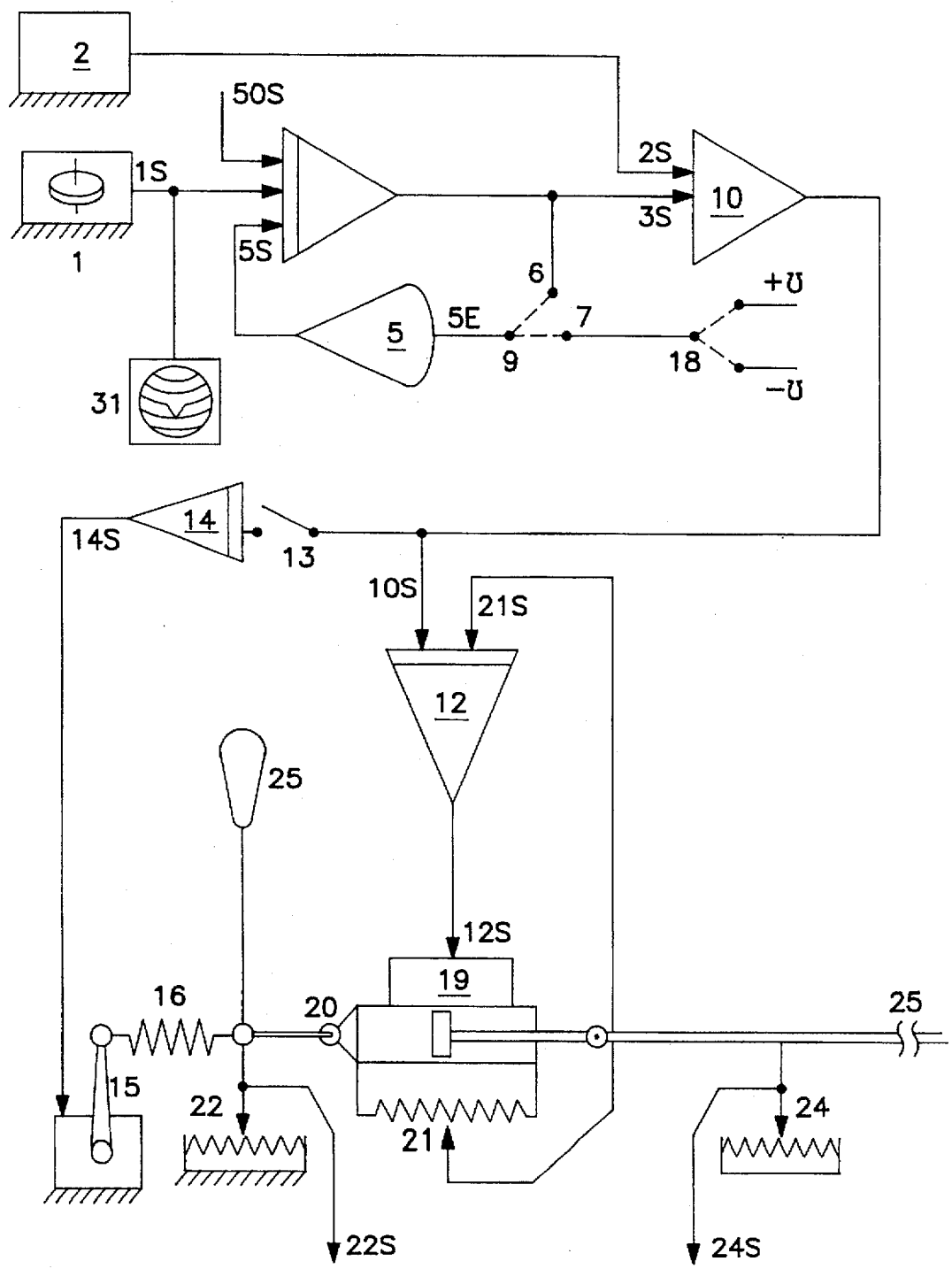
FIG. 1 is a simplified circuit diagram of a basic autopilot apparatus whose main mode relies on maintaining fuselage trim.

As shown in FIG. 1, a basic autopilot for a helicopter and having maintaining fuselage trim as its main mode comprises two systems, one whose main mode is maintaining pitch trim and the other whose main mode is maintaining roll trim. Each of these two systems includes means 1 for generating a signal (1S) that is a function of fuselage trim, and in particular a gyro fuselage trim sensor 1, means 2 for generating a signal (2S) that is a function of the angular speed of the fuselage, means for summing signals, in particular two summing circuits (3) and (10), means (5) for integrating signals, and means of actuating the corresponding flight controls, in particular a power amplifier (12) and an actuator (20).

The gyro sensor (1) measures the value of fuselage trim and generates a signal (1S) that is a function of said value.

The means 2 may be a sensor (2) for sensing angular speed of the fuselage, or in a common variant, it can be replaced by an electrical function that is derived from the trim signal (1S). The signal (2S) from the sensor (2) serves to provide dynamic loop damping for the trim autopilot.

The inputs to the summing circuit (3) are the fuselage trim signal (1S), a signal (5S) from the output of the integrator (5), and optionally a signal (50S) from a flight coupler. The output (3S) from the summing circuit is a function of the angular difference between the actual fuselage trim and the desired fuselage trim. This signal is commonly called the "error signal" in servo-control models.

The integrator (5) serves for "synchronization". The input signal (5E) is:

either the output (3S) from the summing circuit (3); or else an electrical control voltage (7) internal to the basic autopilot.

Selecting which input signal (5E) to apply to the integrator (5) is done by a manual or automatic switch under the control of various possible "piloting modes". The output (5S) from said integrator represents the desired reference fuselage trim.

The summing circuit (10) serves essentially to sum the angular speed of the fuselage (2S) with the output (3S) from the summing circuit (3). The output (10S) from the summing circuit (10) represents the desired position for the autopilot actuator (20).

The input of the power amplifier (12) is constituted by the sum of the signals (10S) and (21S) and its output is such as to enable the autopilot actuator (20) to be actuated.

The autopilot actuator (20) is generally connected "in series" in the flight control under consideration. Usually, the longitudinal cyclic flight control is used for automatically controlling fuselage trim in pitching while the lateral cyclic flight control is used for automatically controlling fuselage trim in rolling. The piloting actuator generally includes a sensor for sensing the mechanical displacement of its own output (21) and outputting an electrical signal (21S) for ensuring a linear relationship between the electrical control voltage (10S) and the actual displacement of the actuator. That is why the power amplifier (12) receives both signals (10S) and (21S) on its input.

The displacements of the actuator (20) are added mechanically to the movements of the pilot's cyclic stick (25) by means of conventional mechanisms known in helicopter technology. The authority of the autopilot actuator (20) is a small percentage of the total authority imparted by the manufacturer to the longitudinal and lateral control signals issued by the cyclic stick.

Apparatus known as "automatic trim" apparatus enables the cyclic stick to be actuated other than by the pilot. In conventional manner, the automatic trim apparatus can be constituted by an electric motor (15) connected to the cyclic control by an elastic device 16 for each of the pitch and roll axes. This elastic device plays the role of safety and of artificial force relationship relative to any danger of the automatic trim motor (15) becoming jammed.

The motor (15) is powered by an amplifier (14) switched on by an automatic switch (13) in application of conventional logic that is not the subject matter of the invention.

The mechanical displacement of the control actuator (20) in pitch is referred to as DMPA and its mechanical displacement in roll is referred to as DLPA. These displacements are measured (21S) by the sensors (21).

The terms DM1 and DL1 designate respectively the mechanical flight control displacements as measured by the autopilot actuators (20), e.g. at the cyclic swashplate of the helicopter rotor. These displacements are measured by sensors (24) and the outputs thereof (24S) are not generally made use of in conventional autopilots.

The pitch and roll trim information (1S) is displayed on an instrument (31) on the instrument panel referred to as a "artificial horizon". In certain embodiments, an independent sensor of fuselage trim is used for controlling the instrument (31).

Figure 2:
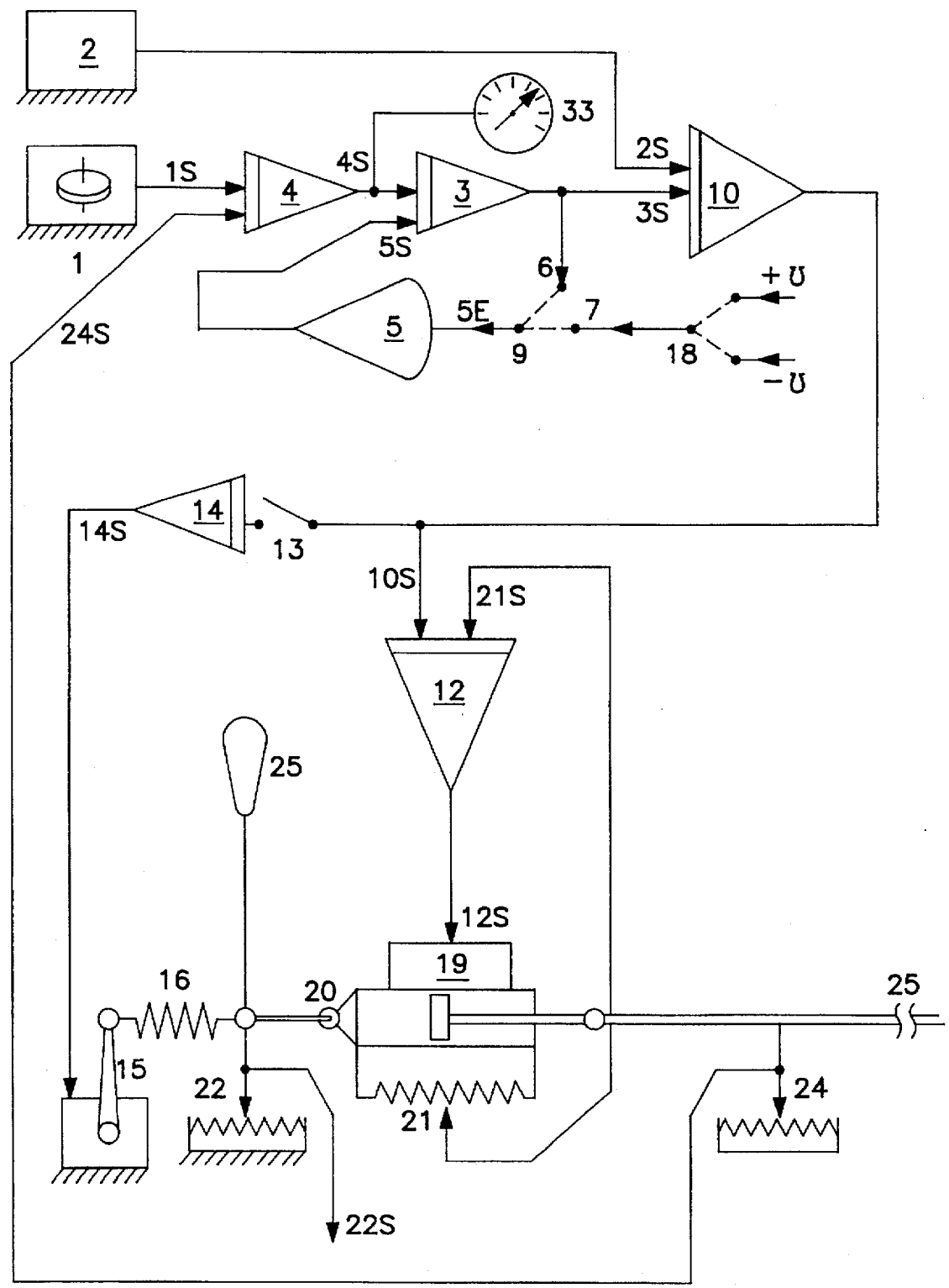
FIG. 2 is a circuit diagram of an autopilot apparatus for stabilizing the speed of a helicopter and constituting a first variant embodiment of the invention.

In the embodiment of the invention shown in FIG. 2, the conventional input (1S) is replaced by a weighted sum (4S) of the signals (1S) and (24S). To make explanation easier, this sum is shown as being performed by a summing circuit (4) that is separate from the summing circuit (3), however in practice a single three-input summing circuit (3) can suffice.

In a specific embodiment of the invention, the amplitude of the signal (1S) is maintained with the same gain as that which would be used in a conventional embodiment, and the input of the summing circuit (4) has added thereto, with appropriate amplitude and polarity, a signal representative of the position of the respective cyclic control DM1 or DL1 of the system under consideration. All of the other signals described above remain unchanged.

The novel property of this configuration is to fix as the reference for the autopilot a signal which is equal to the weighted sum of the signal (1S) representing fuselage trim and the signal (24S) representing the value of the cyclic pitch, either longitudinal or lateral depending on the system under consideration.

It is known that such a weighted sum, i.e. a combination with defined proportions of two signals, has the property, in stable flight without acceleration, of representing airspeed along the axis under consideration.

Consequently, and providing the way in which the signals (1S) and (24S) are combined has been properly adjusted, the autopilot no longer receives as its reference a fuselage trim value, but instead receives an airspeed. The output (4S) from summing circuit (4) may be displayed on a suitable instrument (33).

The output (5S) from the "synchronization" integrator (5) no longer represents a reference trim, but a reference airspeed, which may be displayed on a suitable instrument (32). This speed is adjusted by the switch means (9) and thus, in non-limiting manner, it can take up:

the value of the airspeed at the instant at which the corresponding system is put into operation;

the value set by the pilot during manual maneuvering referred to as "manual trim", consisting (in a particular embodiment and by way of example) in applying a programmed electrical voltage to the input of the circuit by means of a suitable switch (18), with this giving rise to the reference speed being subjected to a variation relationship, e.g. a linear relationship of +1.5 meters per second per second;

the value of the actual airspeed at the instant artificial forces are put back into operation on the cyclic stick; and the value of a future airspeed as preprogrammed or computed as a function of actual acceleration criteria, the dynamics of the novel configuration being particularly suited to this function but being absent from conventional autopilots.

In contrast, the first three functions for adjusting reference airspeed form part of the rules of art for helicopter autopilots and the invention consists in applying them to airspeeds.

Figure 3:
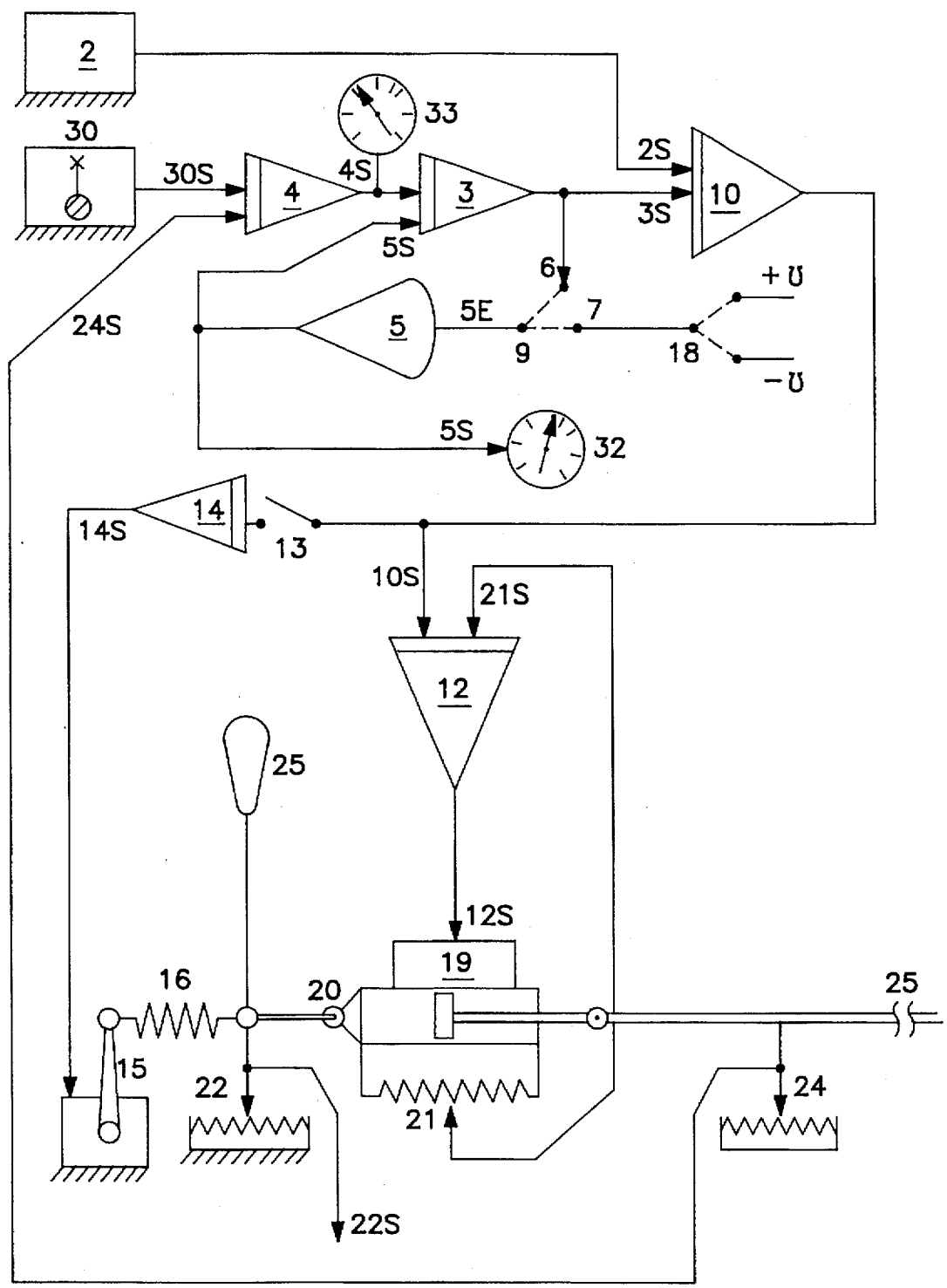
FIG. 3 is a circuit of an autopilot apparatus for stabilizing the speed of a helicopter in a second variant embodiment.
Figure 4:
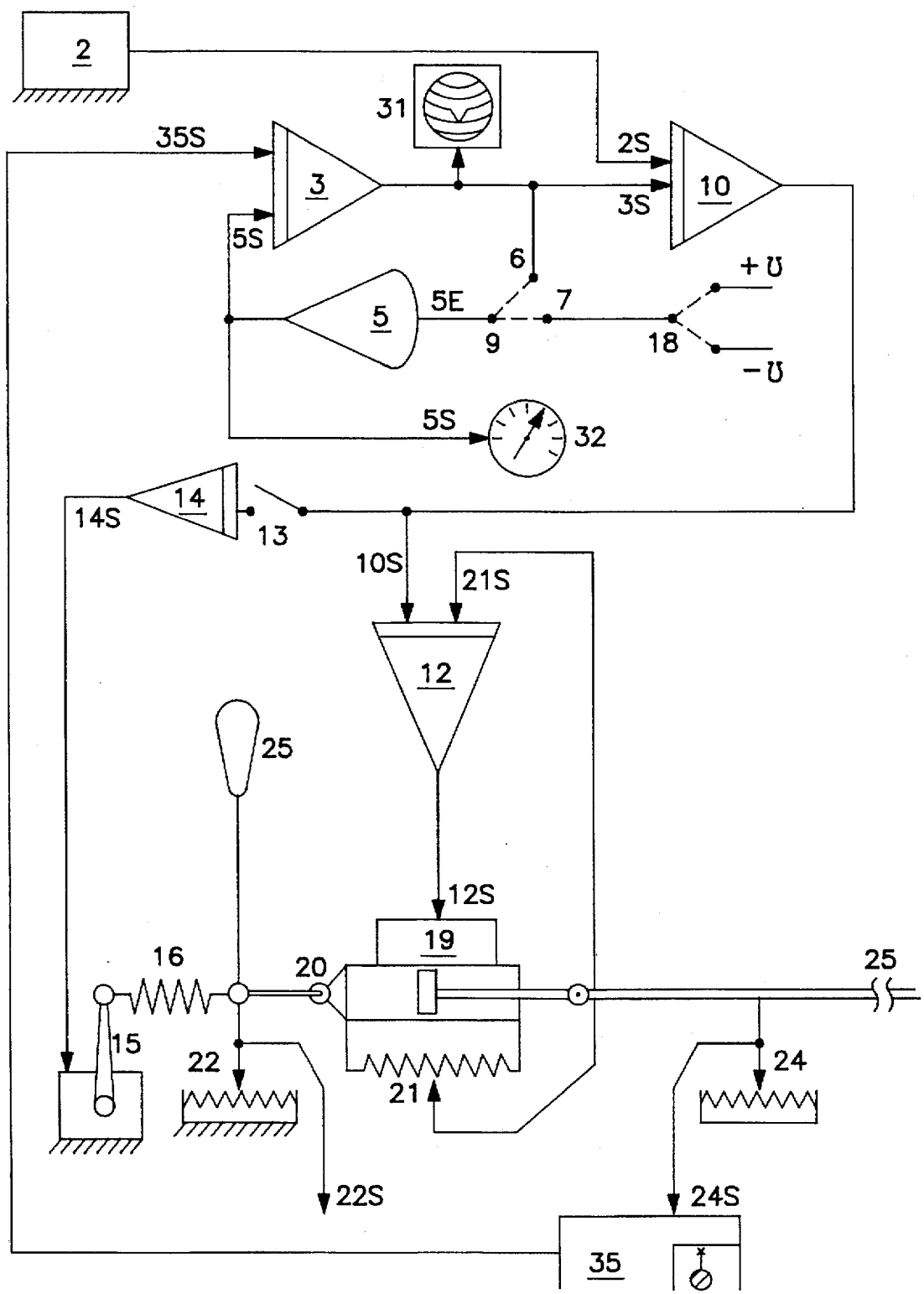
FIG. 4 is a circuit diagram of an autopilot apparatus for stabilizing the speed of a helicopter in a third variant embodiment.

In the embodiments of FIGS. 3 and 4, the fuselage trim sensor (1) is omitted and is replaced by an acceleration sensor (30) referenced to the fuselage (See FIG. 3), or in equivalent manner, by a pendular level (35) constrained relative to the reference axes of the fuselage (See FIG. 4).

Linear acceleration sensors are naturally sensitive to inertia forces and to terrestrial gravitation forces. In combination with the cyclic pitch positions DM1 and DL1, they constitute the main sensors used for measuring airspeed in application of the inventions described in U.S. Pat. Nos. 4,023,409 and 4,648,269.

Solutions in which the fuselage angular speed signals (2S) are constituted by a fuselage trim term subjected to a differentiation operation are naturally not adapted to this second mode of operation; it would be advantageous to use a sensor (2) of the gyro type to generate the signal for damping rapid movements of the fuselage, which damping is desirable whatever the method of piloting.

A solution based on a rate gyro is cheaper and more reliable when specifically generating a damping term than is one based on a free gyro as used for measuring trim values.

In a particular embodiment, the invention proposes using as an additional or as a main damping term the derivative of the signal (4S) which is the sum of the signals (30S) and (24S). Since the signal (4S) is the image of airspeed, its derivative is the image of air acceleration.

In the rules of the art, the appropriateness and the magnitude of the derivative signal that should be included are determined essentially by flight testing the equipment.

I claim:

1. Apparatus for assisting automatic piloting of rotating wing aircraft for the purpose of keeping the lateral and longitudinal components of the airspeed equal to desired reference values therefore, the apparatus comprising two systems, one for roll and the other for pitch, each of said systems having means (1) for generating a signal (1S) that is a function of the trim of the fuselage, summing means having one input receiving said signal that is a function of the trim of the fuselage, integrator means (5) for generating a reference signal (5S), said reference signal being applied as an input of the summing means, means for actuating cyclic flight controls as a function of an output signal of the summing means, cyclic position means (24) for generating a signal (24S) that is a function of the position of the cyclic control for the blades of at least one main rotor the apparatus being characterized in that the output of said cyclic position means (24) is connected to the input of the summing means (4, 3, 10), the summing means (4, 3, 10) producing a weighted sum of the signal (1S) of the trim of the fuselage and of the signal (24S) that is a function of the position of the cyclic control, the integrator means (5) being such that the output signal of said integrator means (5) is representative of a reference airspeed.

2. Apparatus according to claim 1, characterized in that for the pitch system, the fuselage trim signal (1S) is a pitch trim signal THETAF and the cyclic control position signal (24S) is a longitudinal cyclic control position signal DM1, and for the roll system, the fuselage trim signal (1S) is a roll trim signal PHIF and the cyclic control position signal (24S) is a lateral cyclic control position signal DL1.

3. Apparatus according to claim 2, characterized in that the weighted sum produced by the summing means is as follows:

K1*THETAF+K2*DDM1 for pitch, and

K3*PHIF+K4*DL1 for roll, the coefficients K1, K2, K3, and K4 being coefficients for matching gain.

4. Apparatus according to claim 3, characterized in that the coefficients K1, K2, K3, and K4 are fixed numerically by the dynamic relationship interconnecting the cyclic flight controls of the aircraft, in pitch and roll respectively, with the blade angles respectively associated therewith.

5. Apparatus according to any preceding claim, characterized in that the means (1) for generating a signal (1S) that is a function of the fuselage trim are constituted by an accelerometer associated with a reference tied to the fuselage.

6. Apparatus according to claim 1, characterized in that the means (1) for generating a signal (1S) that is a function of the fuselage trim are constituted by a pendular level associated with a reference tied to the fuselage.

7. Apparatus according to claim 1, characterized in that the value of the combination performed by the summing means is displayed to the crew on a direct readout instrument (31).

8. Apparatus according to claim 7, characterized in that the instrument (31) comprises an artificial horizon.

* * * * *